Sept. 20, 1971 A. BALINT 3,606,543
OUT-OF-SYNC DETECTOR FOR FILM PRINTERS
Filed July 28, 1969
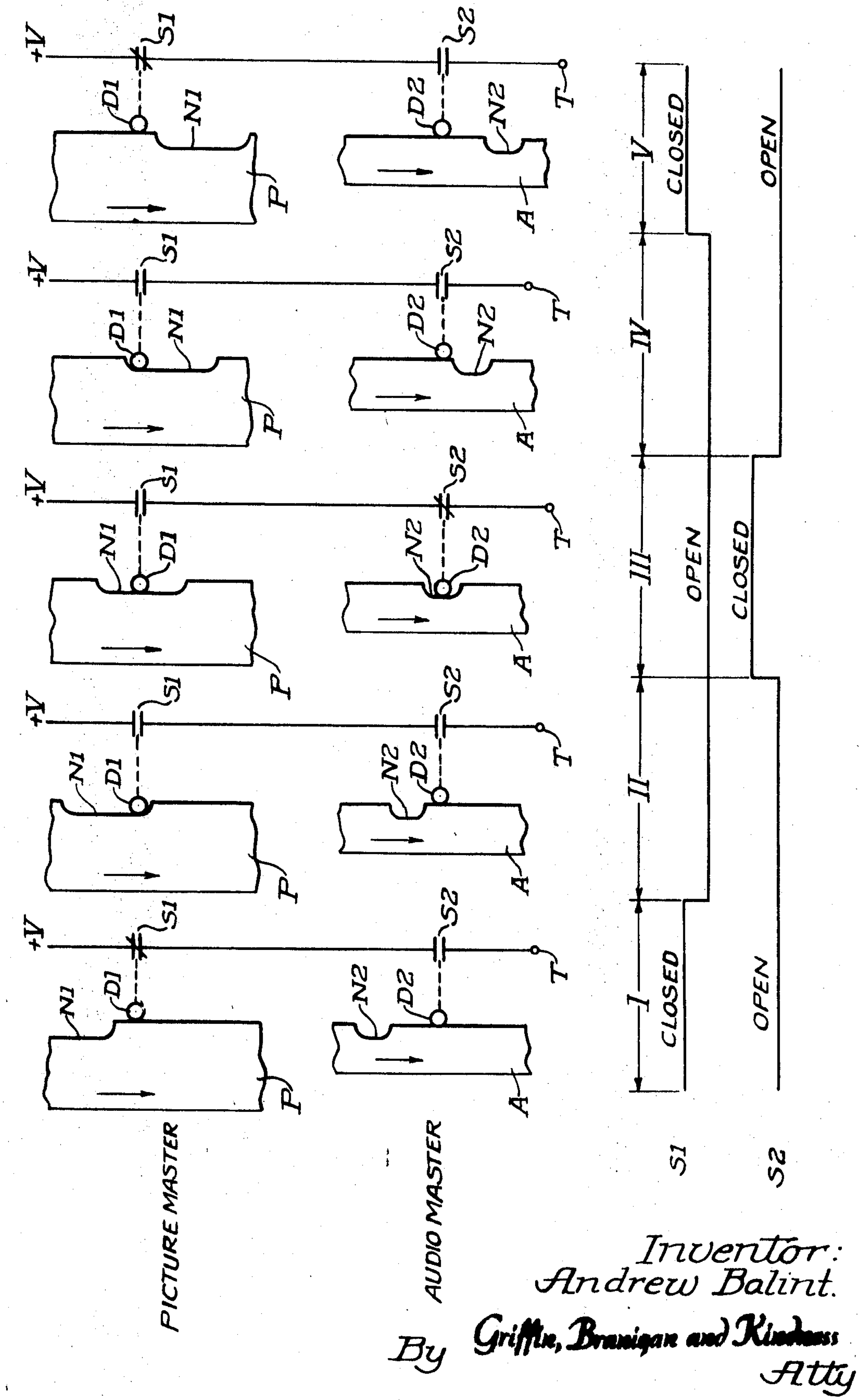
Inventor:
Andrew Balint.
By Griffin, Branigan and Kindness
Atty United States Patent Office 3,606,543

Patented Sept. 20, 1971

3,606,543
OUT-OF-SYNC DETECTOR FOR FILM PRINTERS

Andrew Balint, Park Ridge, Ill., assignor to Bell & Howell Company, Chicago, Ill.

Filed July 28, 1969, Ser. No. 845,168
Int. Cl. G03b *31/04*
U.S. Cl. 352—12 5 Claims

ABSTRACT OF THE DISCLOSURE

An out-of-sync detector for film printers wherein film copies are made by continuous printing from closed loop picture and audio masters. Indicia are located on each master loop and are sensed by detectors. The detectors control the opening and closing of serially connected switches. As long as the two master loops move in synchronism, the switches close at different times, however, if the two master loops drop out-of-sync, both switches are closed at the same time and complete a circuit that shuts down the operation of the printer.

BACKGROUND OF THE INVENTION

Various types of apparatus for printing film copies from audio and picture masters are well known. In general, separate audio and picture masters are mechanically moved. As they move, the audio and picture information contained on the masters is transferred onto the film copy. In some cases, both the audio and the pictures are optical records. And, optical systems are used to transfer both the audio and the picture images onto audio and picture tracks. In other cases, the pictures are optically transferred onto a picture track while the audio is electrically transferred onto a magnetic track.

Regardless of the type of system, one of the problems with prior art printers is maintaining synchronization between the movement of the audio master and the movement of the picture master. That is, if the audio master and the picture master are not moving in synchronism when the film copies are formed, defective copies result. While the foregoing problem is not particularly troublesome with prior art apparatus wherein the picture and audio information are located on strips which move back and forth so that they each start from an initial position for each copy, the problem becomes troublesome when the picture and audio masters are on continuously moving closed loops. If there is even one additional frame on one master relative to the other, for each run of the closed loops, the error in synchronism becomes greater. The problem becomes even more troublesome when there is a reduction in picture or audio information during the transfer, i.e., the audio and the picture move at different speeds during the printing operation.

Therefore, it is an object of this invention to provide an apparatus for aiding in maintaining synchronous movement in picture and audio printers.

It is also an object of this invention to provide an apparatus for sensing the movement of audio and picture masters in a printer so as to detect a lack of synchronism between the movement of the audio and picture masters.

It is another object of this invention to provide an out-of-sync detector for a film printer that detects a lack of synchronism between the movement of closed loop picture and audio masters and generates a signal when a lack of synchronism occurs.

SUMMARY OF THE INVENTION

In accordance with a principle of this invention an out-of-sync detector for picture and audio film printers is provided. One indicia is located on the picture master and another indicia is located on the audio master. The indicia are sensed by detectors which control serially connected switches. When an out-of-sync condition exists between the picture and audio masters, both switches close simultaneously. The simultaneous closing of the switches causes a shut down signal to be applied to the printer.

In accordance with a further object of this invention, the masters are formed on closed loops and one indicia is longer than the other indicia with respect to the direction of movement of the loops. In addition, the switches and the detectors are connected so that the switches are closed at different times as long as there is synchronism between the master loops. However, if the master loops fall out of synchronization, both switches are closed at the same time and complete a circuit that causes the printer to shut down.

It will be appreciated from the foregoing summary of the invention that an out-of-sync detector for detecting synchronism of movement between picture and audio masters in a continuous loop film printer is provided. The system requires that each master include an indicia area, with one area being, preferably, longer than the other area. The indicia bearing areas are detected by suitable detectors which in turn control switches. When out-of-sync condition occurs, both of a pair of serially connected switches are closed which cause the generation of a signal that can be used to shut down the printer. The indicia can be any type of various types such as notches in the film, or magnetic or optical areas that can be sensed by suitable magnetic or optical sensing means. In addition, the switches can be any type of various types, for example, they can be mechanically operated switches or they can be solid state switches.

BRIEF DESCRIPTION OF THE DRAWING

The foregoing objects and many of the attendant advantages of this invention will become more readily appreciated as the same becomes better understood by reference to the following detailed description when taken in conjunction with the accompany drawing wherein a sequence of movement of the indicia areas of the audio and picture masters relative to their respective detectors is illustrated. In addition, the drawing illustrates in time, the opening and closing of the switches operated by the detectors.

DESCRIPTION OF THE PREFERRED EMBODIMENT

The drawing illustrates a sequence of movement of audio and picture masters (A and P, respectively) and is horizontally broken into five sequence sections designated I, II, III, IV and V. Vertically, the drawing is broken into four sections. The first vertical section illustrates the sequential movement of the picture master. The second vertical section illustrates the sequential movement of the audio master. The third vertical section is a timing diagram illustrating the opening and closing of a first set of switch contacts S1 operated by the picture master, and the fourth section is a timing diagram illustrating the opening and closing of a second set of switch contacts S2 operated by the audio master.

For purposes of simplicity and ease of description, the indicia on the picture master P is illustrated as a notch designated N1 located along one edge of the picture master. For similar reasons, the indicia on the audio master A is illustrated as a notch designated N2 located along one edge of the audio master. As illustrated in the figure, N1 is longer than N2—either due to its formation or because of a differential in the speed of movement between P and A.

The indicia notch N1 of the picture master P coacts with a picture indicia detector designated D1. More specifically, a picture indicia detector D1 is pressed (by means not shown) against the film master on its right edge as viewed in the figure. As the picture master's notch N1 passes the detector (as the picture master moves in the direction of the arrow), the detector moves into the notch. When the detector is out of notch N1 (sequence sections I and V) the first set of switch contacts S1 operated by D1 are closed. When the detector is in notch N1 (sequence sections II, III and IV) the first set of switch contacts S1 are open.

A similar detector designated D2 co-acts with the audio master's notch N2 in much the same way that D1 co-acts with N1. The audio master detector D2 operates the second set of switch contacts S2.

Specifically, when D2 is out of N2, S2 is open and when D2 is in N2, S2 is closed. Hence, S2 operates opposite to the way S1 operates. S1 and S2 are connected in series between a voltage source designated +V and a terminal designated T. Due to this serial connection S1 and S2 must be simultaneously closed before +V applies a voltage to T.

The audio and picture masters A and P illustrated in the figure are only portions of complete audio and film masters. Preferably, they are portions of closed loop audio and picture masters, however, they could be portions of non-closed loop audio and picture masters. That is, while the invention benefits closed loop printers more than non-closed loop printers, it still can be used with and will benefit a non-closed printer.

Turning now to a description of the sequence of operation of the picture master shown in a figure, in section I the picture master's detector D1 is out of N1, hence as previously described S1 is closed. As the picture master P continues to move in the direction of the arrow, it enters sequence section II. In section II, D1 moves into N1 and, hence, S1 opens. D1 remains in N1 as the picture master moves through sequence sections III and IV, consequently, S1 remains open. When the picture master reaches sequence section V, D1 moves out of N1 and S2 closes.

Turning next to the sequence of operation of the audio master, when it is in sequence section I, D2 is out of N2 and S2 is open. S2 remains open through sections II because D2 remains out of N2. However, when the audio master reaches sequence section III, D2 moves into N2 and closes. As the audio master continues to move and enters section IV, D2 moves out of N2 and S2 again opens. S2 remains open through sequence section V because D2 remains out of N2.

From the foregoing description and viewing lines S1 and S2 of the figure which illustrates the opening and closing of the switches in time, it will be appreciated that S1 and S2 are never simultaneously closed for the sequence illustrated in the figure. And, because S1 and S2 are never closed at the same time, no voltage is applied by +V to T. Hence, this is the sequence that occurs when the picture master P and the audio master A are moving in synchronism.

Turning now to the situation that occurs when P and A are not moving in synchronism, assuming first that P is lead A, then the opening and closing of S1 shifts to the left as viewed in the figure with respect to the opening and closing of S2. When this situation occurs to the point that sequence V for S1 coincides with sequence section III for S2, both S1 and S2 are closed at the same time. When S1 and S2 are closed at the same time, +X applies a voltage to T which voltage or signal can be utilized to turn off or shut down the printer machine and, thereby, prevent further defective copies from being printed. After the masters are again synchronized, the printing machine can be restarted and will continue to print copies until an out-of-sync condition again occurs.

Assuming next the alternate situation (i.e. that P starts to lag A) then the S1 timing line illustrated in the figure shifts to the right with respect to the S2 timing line until sequence section III of S2 coincides with sequence section I of S1. At this point, S1 and S2 again are both closed at the same time, and as before, when this condition occurs, a signal is applied by +V to T which shuts down the printing machine.

It will be appreciated from the foregoing description that the invention provides a rather uncomplicated apparatus for detecting a lack of synchronism between picture and audio masters in a film copy printing machine. For purposes of ease of description and symplicity of drawing, a mechanically moveable detecting device for detecting indicia points (notches) in picture and audio masters has been illustrated and described. However, it will be appreciated by those skilled in the art that other types of indicia and other types of detection systems are more likely to be used in actual embodiment of the invention. For example, the notches could be replaced by opaque regions located along the edge of the picture and audio masters. The opaque regions would be sensed by a light-photocell detector system, for example. The output from the light-photocell detector system would be connected so as to operate switches connected in series in the manner illustrated in the figure. The switches could be conventional mechanically operated switch contacts or solid state switches. Alternatively, the notches could be replaced by magnetic regions located along the edge of the audio and picture masters. The magnetic regions would be detected by a suitable magnetic detecting means, such as a magnetic record head. As before, the detected signal would operate either conventional or solid state switches. Consequently, all that is necessary for an operative embodiment of the invention is for the picture and audio masters to each have an indicia bearing point located, preferably, along one of their edges. Detecting means must be mounted so as to detect the indicia points as the indicia points pass a predetermined fixed point. The output from the detecting means is connected so as to control serially connected switches in the manner herein described.

It should be noted, that while longer notch or indicia point has been illustrated and described as being located on the picture master and the shorter notch or indicia point as being located on the audio master, these could be reversed. That is, the audio master could contain the longer indicia bearing point and the picture master the shorter indicia bearing point. For such an embodiment switch operation would also have to be reversed. In addition, more than one indicia point can be located on each audio and picture master.

It will be appreciated from the foregoing description that various changes can be made in the preferred embodiment of the invention herein disclosed. Hence, the invention can be practiced otherwise than specifically described herein.

The embodiments of the invention in which exclusive property or privilege is claimed are defined as follows:

1. An out-of-sync detector for film printers wherein film copies are printed from picture and audio masters, said picture and audio masters including indicia points located at predetermined positions, said detector comprising:

picture detector means for detecting said indicia points on said picture master;

audio detector means for detecting said indicia points on said audio master;

first switch means operatively connected to said picture detector means for controlling the passage of an electric current in accordance with status of said picture detector means and, second switch means operatively connected to said audio detector means for controlling the passage of an electric current in accordance with the status of said audio detector means, said first and second switch means being connected in series so as to inhibit the passage of an electric current when said picture and audio masters are moving in synchronism and pass an electric current when said picture and audio masters are out-of-synchronism.

2. An out-of-sync detector as claimed in claim 1 wherein said first switch means includes a single set of switch contacts that are normally closed and are open when said picture detector means detects an indicia point on said picture master and wherein said second switch means includes a single set of switch contacts that are normally open and are closed when said audio detector means detects an indicia point on said audio master.

3. An out-of-sync detector as claimed in claim 1 wherein:

said indicia points on said picture master comprise at least one notch located in the edge of said picture master;

said indicia points on said audio master comprise at least one notch located in the edge of said audio master; and, said audio detector means and said picture detector means comprise mechanical elements adapted to move into and out of the notches located in the edges of said picture and audio masters.

4. An out-of-sync detector as claimed in claim 3 wherein the notch located in the edge of one of said picture and audio masters is longer than the notch located in the edge of the other of said picture and audio masters.

5. An out-of-sync detector as claimed in claim 4 wherein said first switch means includes a single set of switch contacts that are normally closed and are open when said picture detector means detects said at least one notch in said picture master and said second switch means includes a single set of switch contacts that are normally open and are closed when said audio detector means detects said at least one notch in said audio master.

References Cited

UNITED STATES PATENTS

| | | | |
|---|---|---|---|
| 1,747,037 | 2/1930 | Tschopp | 340—260 |
| 1,989,971 | 2/1935 | Cretin | 340—260 |
| 2,005,737 | 6/1935 | Foster et al. | 352—20 |
| 2,569,228 | 9/1951 | Clark et al. | 340—268 |
| 2,693,127 | 11/1954 | Ortman | 352—17 |
| 3,259,011 | 7/1966 | Yamada | 352—17X |

LOUIS R. PRINCE, Primary Examiner

J. W. ROSKOS, Assistant Examiner

U.S. Cl. X.R.

340—260, 268; 352—92